United States Patent [19]

Law et al.

[11] Patent Number: 4,525,592

[45] Date of Patent: Jun. 25, 1985

[54] PROCESS FOR SQUARAINE COMPOSITIONS

[75] Inventors: Kock-Yee Law, Fairport; Frank C. Bailey, Webster, both of N.Y.

[73] Assignee: Xerox Corporation, Stamford, Conn.

[21] Appl. No.: 557,796

[22] Filed: Dec. 5, 1983

[51] Int. Cl.$^3$ .................... C07C 85/00; C07C 85/02; C07C 85/06
[52] U.S. Cl. .................................................. 564/307
[58] Field of Search ....................................... 564/307

[56] References Cited

PUBLICATIONS

White et al., "J.A.C.S.", 86, pp. 453–458, 2/64.
"The Chemistry of Squaraines", Schmidt, Oxocarbon, (1980), pp. 185–231.

Primary Examiner—Paul F. Shaver
Attorney, Agent, or Firm—E. O. Palazzo

[57] ABSTRACT

This invention relates to an improved process for the preparation of squaraine compositions which comprises reacting a dialkyl squarate, with an aniline, in the presence of an acid and an aliphatic alcohol, at a temperature of from about 60 degrees Centigrade to 160 degrees Centigrade.

16 Claims, No Drawings

PROCESS FOR SQUARAINE COMPOSITIONS

BACKGROUND OF THE INVENTION

This invention relates generally to an improved process, and more specifically, the present invention is directed to an improved process for preparing squaraine compositions of matter, which are useful in layered photoresponsive imaging devices. In one embodiment, the present invention involves the preparation of certain squaraine compositions by the reaction of dialkyl squarates with aniline derivatives. The squaraine compositions resulting are useful for incorporation into layered photoresponsive imaging devices wherein, for example, the sensitivity thereof can be varied or enhanced, allowing such devices to be capable of being responsive to visible light, and infrared illumination needed for laser printing, especially with gallium arsenide diode lasers. The photoresponsive device envisioned can, for example, contain situated between a photogenerating layer and a hole transport layer, or situated between a photogenerating layer, and a supporting substrate, a photoconductive composition comprised of the squaraine compositions prepared in accordance with the process of the present invention. These squaraine compositions are believed to be primarily responsible for enhancing or reducing the intrinsic properties of the photogenerating layer in the infrared and/or visible region of the spectrum, thereby allowing such devices to be sensitive to visible light, and/or infrared wavelengths.

Photoconductive imaging members containing certain squaraine compositions, particularly hydroxy squaraines, are known. Also known are layered photoresponsive devices with photogenerating layers and transport layers, reference U.S. Pat. No. 4,265,990. Examples of photogenerating layers disclosed in this patent include trigonal selenium, and phthalocyanines, while examples of transport layers that may be selected are comprised of certain diamine dispersed in an inactive resinous binder composition. Moreover, the use of certain squaraine pigments in photoresponsive imaging devices is disclosed in a copending application, wherein there is described an improved photoresponsive device containing a substrate, a hole blocking layer, an optional adhesive interface layer, an inorganic photogenerating layer, a photoconductive composition capable of enhancing or reducing the intrinsic properties of the photogenerating layer, and a hole transport layer. As photoconductive compositions for this device, there can be selected various squaraine pigments, including hydroxy squaraine compositions of the formula as outlined on page 13, beginning at line 21 of the copending application. Additionally, there is disclosed in U.S. Pat. No. 3,824,099 certain photosensitive hydroxy squaraine compositions. According to the disclosure of this patent, the squaraine compositions are photosensitive in normal electrostatographic imaging systems.

In another copending application, there is described novel squaraine compositions of matter, such as bis-9-(8-hydroxyjulolidinyl)squaraine, and the use of these compositions as imaging members. One of the imaging members contains a supporting substrate, a hole blocking layer, an optical adhesive interface layer, an inorganic photogenerating layer, a photoconducting composition layer capable of enhancing or reducing the intrinsic properties of the photogenerating layer, which compositions are comprised of the novel julolidinyl squaraines materials disclosed in the copending application, and a hole transport layer.

Processes for preparing squaraine compositions generally involve the reaction of squaric acid with an amine. Thus, for example, the novel julolidinyl squaraine compositions disclosed in the referenced copending application are prepared by the reaction of an aromatic amine and squaric acid, in a molar ratio of from about 1.5:1 to 3:1 in the presence of a mixture of an aliphatic alcohol and an optional azeotropic cosolvent. About 200 milliliters of alcohol per 0.1 mole of squaric acid are used, while from about 40 milliliters to about 4,000 milliliters of azeotropic material are selected. The squaric acid reaction is generally accomplished at a temperature of from about 50 degrees Centigrade to about 130 degrees Centigrade. Illustrative examples of amine reactants include 8-hydroxyjulolidine, while examples of aliphatic alcohol selected include 1-butanol, with the azeotropic materials being aromatic compositions such as benzene and toluene. Similarly all other known processes involve squaric acid as a starting reactant.

While the above processes for preparing squaraine compositions may be suitable for their intended purposes, there continues to be a need for other processes wherein squaraine compositions, useful as photoconductive materials, can be prepared. Additionally, there remains a need for simple, economical processes for preparing squaraine compositions wherein the squaraine products obtained contain substantially less impurities than those squaraines resulting from the squaric acid process, as it is believed that the presence of impurities in the squaraine compositions resulting from the squaric acid process causes the photosensitivity of these compositions to vary significantly, and in many instances, to be lower than the squaraine compositions prepared in accordance with the process of the present invention. Further, there continues to be a need for novel squaraine compositions which, when selected for layered photoresponsive imaging devices, allow the generation of acceptable images, and wherein such devices can be repeatedly used in a number of imaging cycles without deterioration thereof from the machine environment or surrounding conditions. Moreover, there remains a need for processes for preparing certain squaraine compositions, wherein the resulting products when incorporated into imaging members exhibit excellent dark decay and superior photosensitivity. Also, there is provided in accordance with the process of the present invention xerographic photoconductive devices comprised of a novel class of infrared squaraine photogenerating materials possessing desirable sensitivity, low dark decay, and high charge acceptance values.

SUMMARY OF THE INVENTION

It is therefore an object of the present invention to provide improved processes for preparing squaraine compositions.

In another object of the present invention, there are provided improved processes for preparing certain squaraine compositions with enhanced photosensitivity, excellent dark decay properties, and acceptable charge acceptance.

In yet another object of the present invention, there are provided simple economical processes for preparing certain squaraine compositions.

In still a further object of the present invention, there are provided improved processes for obtaining squaraine compositions of matter, which contain substantially less impurities than similar squaraines prepared by the known squaric acid process.

In another object of the present invention, there are provided improved processes for obtaining hydroxy squaraines, julolidine squaraines, fluorinated squaraines and other squaraines, by the reaction of a dialkyl squarate with an aromatic aniline.

A further object of the present invention resides in the preparation of squaraine compositions wherein the the particle sizes of the resulting products are desirably less than about 2 microns or about a factor of 2 smaller in many instances than those squaraine materials prepared from the known squaric acid process.

These and other objects of the present invention are generally accomplished by the reaction of a dialkyl squarate, and aniline, in the presence of a catalyst and an aliphatic alcohol. More specifically, the process of the present invention comprises reacting at a temperature of from about 60 degrees Centigrade to 160 degrees Centigrade, a dialkyl squarate, with a dialkyl aniline, in the presence of an acid catalyst, and an aliphatic alcohol. The reaction involved is represented by the following illustrative equations:

GENERAL REACTION

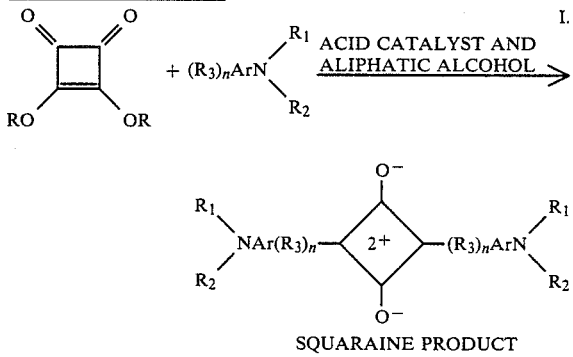

SQUARAINE PRODUCT

SPECIFIC REACTION

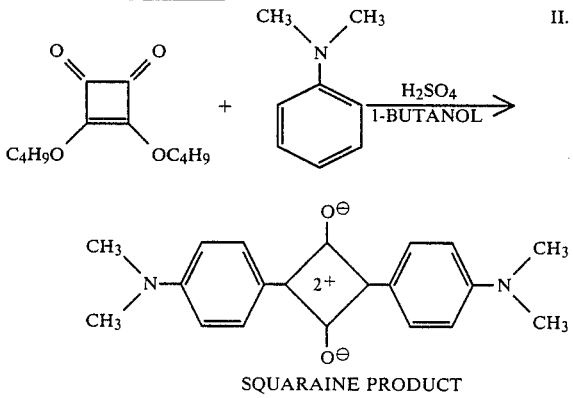

SQUARAINE PRODUCT wherein R, $R_1$, and $R_2$ are independently selected from alkyl groups, $R_3$ is an alkyl group, a hydroxy group, or fluorine, Ar is an aromatic group, and n is the number zero or 1.

Alkyl substitutents include those containing of from about 1 carbon atom to about 10 carbon atoms, and preferably from 1 carbon atom to about 6 carbon atoms, including methyl, ethyl, propyl, butyl, pentyl, hexyl, heptyl, nonyl, and decyl. Preferred alkyl groups are methyl, ethyl, propyl, and butyl.

Aromatic substitutents include those containing from about 6 carbon atoms to about 24 carbon atoms such as phenyl, and naphthal, with phenyl being preferred.

The $R_3$ substituents, as indicated, can be an alkyl group, as defined herein, or may be selected from hydroxy, or fluorine.

Illustrative examples of dialkyl squarate reactants include dimethyl squarate, dipropyl squarate, diethyl squarate, dibutyl squarate, dipentyl squarate, dihexyl squarate, diheptyl squarate, dioctyl squarate, and the like, with the dimethyl, diethyl, dipropyl, and dibutyl squarates being preferred. Illustrative examples of aniline reactants include N,N-dimethylaniline, N,N-diethylaniline, N,N-dipropylaniline, N,N-dibutylaniline, N,N-dipentylaniline, N,N-dihexylaniline, 3-methyl-N,N-dimethylaniline, 3-hydroxy-N,N-dimethylaniline, 3-fluoro-N,N-dimethylaniline, 3-hydroxy-N,N-diethylaniline, 3-ethyl-N,N-dimethylaniline and the like.

The reaction is accomplished in the presence of an acid catalyst, examples of which include various inorganic acids, and organic acids, such as sulfuric acid, trichloroacetic acid, oxalic acid, toluene sulfonic acid, and the like, with sulfuric acid and trichloroacetic being preferred.

Known solvents, such as aliphatic alcohols, including methanol, ethanol, propanol, butanol, especially water saturated 1-butanol, amyl alcohol, and the like are selected for the purpose of forming a solution of the squarate and the acid catalyst. Other solvents can be used providing the objectives of the present invention are accomplished, that is wherein such solvents will allow the formation of a homogeneous solution of the dialkyl squarate, and the acid catalyst.

The reaction temperature can vary over a wide range, and is generally dependent on the reactants selected, and other similar factors. Generally, the reaction temperature is established at a temperature at which the aliphatic alcohol boils. Thus, for example, the reaction temperature is generally from about 60 degrees Centigrade to about 160 degrees Centigrade, and is preferably from about 98 degrees Centigrade to about 140 degrees Centigrade, especially when the aliphatic alcohol selected contains a carbon chain length of from about 3 carbon atoms to about 5 carbon atoms.

The amount of reactants and catalyst selected depend on a number of factors, including the specific reactants used, and the reaction temperature involved. Generally, however, from about 5 millimoles, to about 50 millimoles, of dialkyl squarate, with about 10 millimoles to about 100 millimoles of aniline, and from about 5 milliliters to about 50 milliliters of aliphatic alcohol are selected. Also from about 4 millimoles to about 40 millimoles of protons, are contained in the acid catalyst.

The resulting products subsequent to separation from the reaction mixture, by known techniques, including filtration, were identified primarily by melting point data, infrared analysis, and visible absorption spectroscopy. Additionally, the data generated from these techniques was compared with the data available for the identical compounds prepared from the squaric acid process. Further, elemental analysis for the respective substituents, such as analysis for carbon, hydrogen, nitrogen, and fluorine was accomplished.

Illustrative examples of specific squaraine compositions resulting from the process of the present invention include bis(4-dimethylaminophenyl)squaraine, bis(4- diethylaminophenyl)squaraine, bis(2-fluoro-4-dimethylaminophenyl)squaraine, bis(2-fluoro-4-diethylaminophenyl)squaraine, bis(2-hydroxy-4-dimethylaminophenyl)squaraine, bis(2-hydroxy-4-diethylaminophenyl)squaraine, bis(2-methyl-4-dimethylaminophenyl)squaraine, and the like. The fluorinated squaraine compositions prepared in accordance with the process of the present invention are believed to be novel compositions of matter. These compositions are described in U.S. Pat. No. 4,486,520, the disclosure of which is totally incorporated herein by reference.

In one specific embodiment, the process of the present invention comprises forming a solution of the dialkyl squarate reactant, and acid catalyst, by mixing from about 5 to about 50 millimoles, of dialkyl squarate, with from about 0.1 milliliters to about 1 milliliter of sulfuric acid, and from about 5 milliliters to about 50 milliliters of aliphatic alcohol. This mixture is heated to a temperature of from about 60 degrees Centigrade to about 160 degrees Centigrade, with continual stirring. While heating, the aniline reactant, in an amount of from about 10 to about 100 millimoles is added slowly, over a period of from about 6 to about 12 hours. After further heating, for a period of from about 24 hours to about 40 hours, the reaction mixture is allowed to cool and there is isolated by filtration the desired squaraine product. The products obtained were of a small particle size, ranging from about less than 0.1 microns to about less than 2.0 microns, which small particle sizes provide for the superior dispersion of these squaraine compositions in a resinous binder composition, thereby enabling excellent dark decay properties, high charge acceptance and superior photosensitivity for these compositions as compared to similar squaraines prepared by the squaric acid process.

The squaraine compositions prepared in accordance with the process of the present invention, including the novel fluorinated squaraines are useful as photoconductive substances. Thus there can be prepared a layered photoresponsive device comprised of a supporting substrate, a hole transport layer, and a photoconductive layer, comprised of the squaraine compositions prepared in accordance with the process of the present invention, which composition is situated between the supporting substrate and the hole transport layer. In another embodiment, the photoresponsive device envisioned is comprised of a substrate, a photoconducting layer, comprised of the squaraine compositions prepared in accordance with the process of the present invention, and situated between the photoconducting squaraine layer, and the supporting substrate, a hole transport layer. Additionally, there can be prepared photoresponsive devices useful in printing systems wherein the imaging member is comprised of a layer of the squaraine photoconductive composition prepared in accordance with the process of the present invention, situated between a photogenerating layer, and a hole transport layer, or wherein the squaraine photoconductive squaraine composition layer is situated between a photogenerating layer, and the supporting substrate of such a device. In the latter devices, the photoconductive layer comprised of the squaraine compositions serves to enhance or reduce the intrinsic properties of the photogenerating layer in the infrared and/or visible range of the spectrum. These devices are described in a copending application U.S. Ser. No. 493,114 filed 5/9/83, now U.S. Pat. No. 4,471,041, the disclosure of which is totally incorporated herein by reference.

One specific improved photoresponsive device containing therein the squaraines prepared in accordance with the process of the present invention is comprised in the order stated of (1) a supporting substrate, (2) a hole blocking layer, (3) an optional adhesive interface layer, (4) an inorganic photogenerator layer, (5) a photoconductive composition layer capable of enhancing or reducing the intrinsic properties of the photogenerating layer, which composition is comprised of the squaraine materials prepared in accordance with the process of the present invention, and (6) a hole transport layer.

The photoresponsive devices described can be prepared by a number of known methods, reference for example the copending applications indicated, the process parameters and the order of coating of the layers being dependent on the device desired. Thus, for example, a three layered photoresponsive device can be prepared by vacuum sublimation of the photoconducting layer on a supporting substrate, and subsequently depositing by solution coating the hole transport layer. In another process variant, the layered photoresponsive device can be prepared by providing the conductive substrate containing a hole blocking layer and an optional adhesive layer, and applying thereto by solvent coating processes, laminating processes, or other methods, a photogenerating layer, a photoconductive composition comprised of the novel squaraines of the present invention, which squaraines are capable of enhancing or reducing the intrinsic properties of the photogenerating layer in the infrared and/or visible range of the spectrum, and a hole transport layer.

The improved photoresponsive devices of the present invention can be incorporated into various imaging systems, such as those conventionally known as xerographic imaging processes. Additionally, the improved photoresponsive devices of the present invention containing an inorganic photogenerating layer, and a photoconductive layer comprised of the novel squaraines of the present invention can function simultaneously in imaging and printing systems with visible light and/or infrared light. In this embodiment, the improved photoresponsive devices of the present invention may be negatively charged, exposed to light in a wavelength of from about 400 to about 1,000 nanometers, either sequentially or simultaneously, followed by developing the resulting image and transferring to paper. The above sequence may be repeated many times.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

There was prepared bis(4-dimethylaminophenyl)squaraine, by reacting di-n-butyl squarate, with N,N-dimethylaniline. Initially, there was prepared di-n-butyl squarate, by dissolving 50 grams of squaric acid, in 200 milliliters of toluene, and 200 milliliters of 1-butanol. This mixture was caused to reflux azeotropically for about 16 hours, and any water formed was removed by a Dean-Stark trap. Subsequent to completion of the reaction, the excess toluene and butanol solvents were removed under a reduced pressure, and there was isolated by vacuum distillation, at about 148 degrees Centigrade, and at about 0.1 mm of mercury, di-butyl squarate, in a yield of about 95 percent.

The above-prepared di-n-butyl squarate, 1.13 grams, 5 millimoles, was then dissolved in 5 milliliters of water saturated 1-butanol, containing 0.1 milliliters of concentrated sulfuric acid in a 100 milliliter 3-neck flask, which was equipped with a magnetic stir bar, and a nitrogen gas inlet. The reaction mixture was stirred and caused to reflux by heating the oil bath surrounding the 100 milliliter 3-neck flask, to a temperature of about 120 to 130 degrees Centigrade. Subsequently, there was added over a period of about 8 hours, about 2 drops every 35 minutes, 1.3 milliliters, 10.2 millimoles, of N,N-dimethylaniline. On completion of the addition, the color of the reaction mixture was light yellow green. Refluxing was continued for about 24 to 40 hours and after cooling to room temperature, 2 milliliters of triethylamine, 30 milliliters of an ether/methanol mixture, ratio 1:1, were added to the solution. The resulting precipitated product was separated from the reaction mixture by filtration, with a medium sintered glass funnel, followed by washing with an ether/methanol solution, 1:1 ratio, this washing continuing until the filtrate was light blue. There resulted 0.72 grams, about a 45 percent yield, of bis(4-dimethylaminophenyl)squaraine as identified by elemental carbon, hydrogen, nitrogen analysis, melting point data, absorption spectroscopy, and infrared analysis.

Melting Point: 270 degrees Centigrade

Calculated For $C_{20}H_{20}N_2O_2$: C, 74.98; H, 6.29; N, 8.74. Found: C, 75.11; H, 6.46; N, 9.06.

EXAMPLE II

The process of Example I was repeated with the exception that there was selected as a replacement for the di-n-butyl squarate, dimethyl squarate, synthesized according to the proces as outlined in the Journal of American Chemical Society, Volume 88, page 1533 (1966). There resulted in a yield of 52.5 percent bis(4-dimethylaminophenyl)squaraine which was identified in accordance with the procedure of Example I, with substantially identical results.

EXAMPLE III

The process of Example I was repeated with the exception that there was selected as a replacement for the di-n-butyl squarate, di-n-propyl squarate, prepared from squaric acid and 1-propanol, in 95 percent yield, resulting in a 47 percent yield of bis(4-dimethylaminophenyl)squaraine which was identified in accordance with the procedure of Example I, with substantially identical results.

EXAMPLE IV

The process of Example I was repeated with the exception that there was selected as a replacement for the sulfuric acid, 0.6 grams of trichloroacetic acid, and there resulted in 47 percent yield, bis(4-dimethylaminophenyl)squaraine which product was identified in accordance with the procedure of Example I with substantially identical results.

EXAMPLE V

There was prepared bis(2-fluoro-4-dimethylaminophenyl)squaraine, by the reaction of a dialkyl squarate and 3-fluoro-N,N-dimethylaniline.

The above-prepared di-n-butyl squarate, 1.13 grams, 5 millimoles, was dissolved in 5 milliliters of water saturated 1-butanol containing 0.1 milliliters of concentrated sulfuric acid, in a 100 milliliter 3-neck flask, equipped with a magnetic stir bar and a nitrogen inlet. This mixture was stirred and allowed to reflux under an inert atmosphere, by maintaining an oil bath containing the 3-neck flask, at a temperature of from 120 degrees Centigrade to 130 degrees Centigrade. Subsequently 1.40 grams, of 3-fluoro-N,N-dimethylaniline was added to the reaction mixture through a pressure equalizing funnel, over a period of about 7 to 8 hours, 2 drops every 30 minutes. At the end of this period, the solution turned a light green in color. Refluxing was continued for about 24 hours, and the reaction material was cooled to room temperature, at which time there was added 2 milliliters of triethylamine, and 30 milliliters of an ether/methanol mixture, 1:1 ratio. The resulting precipitated product was isolated from the reaction mixture by filtration through a fine sintered glass funnel followed by washing with an ether/methanol solution, 1:1 ratio, until the filtrate was light blue in color. There was obtained about 0.34 grams, 19 percent yield, bis(2-fluoro-4-dimethylaminophenyl)squaraine as confirmed by elemental carbon, hydrogen, nitrogen and fluorine analysis, absorption spectroscopy, infrared analysis, and mass spectrum analysis. Additionally, the melting point of this material was 273 degrees Centigrade.

Calculated for $C_{20}H_{18}N_2O_2F_2$: C, 67.44; H, 5.09; N, 7.87; F, 10.67. Found: C, 67.58; H, 5.35, N, 7.79; F, 10.81.

EXAMPLE VI

The above-mentioned di-n-butyl squarate, 1.13 grams, 5 millimoles was dissolved in 5 milliliters of water saturated 1-butanol containing 0.1 milliliters of concentrated sulfuric acid, in a 3-neck flask, equipped with a magnetic stir bar and a nitrogen inlet. This mixture was stirred and allowed to reflux under an inert atmosphere, by maintaining an oil bath at a temperature of from 120 degrees Centigrade to 130 degrees Centigrade. Subsequently 1.38 grams, of 3-methyl-N,N-dimethylaniline was added to the reaction mixture through a pressure equalizing funnel, over a period of 8 hours, 2 drops every 30 minutes. At the end of this point, the solution turned a light green color. Refluxing was continued for about 24 to 40 hours, and the reaction material was cooled to room temperature, at which time there was added 2 milliliters of triethylamine, and 30 milliliters of an ether/methanol mixture, 1:1 ratio. The resulting precipitated product was isolated from the reaction mixture by filtration through a medium sintered glass funnel followed by washing with an ether/methanol solution, 1:1 ratio, until the filtrate was light blue in color. There was obtained about 1.01 grams, 58 percent yield, of bis(2-methyl-4-dimethylaminophenyl)-squaraine as confirmed by elemental carbon, hydrogen and nitrogen analysis, absorption spectroscopy, infrared analysis, and mass spectrum analysis. Additionally, the melting point of this material was 252 degrees Centigrade.

Calculated for $C_{22}H_{24}N_2O_2$: C, 75.83; H, 6.94; N, 8.04. Found: C, 75.97; H, 7.04; N, 8.09.

EXAMPLE VII

The above-prepared di-n-butyl squarate, 1.13 grams, 5 millimoles was dissolved in 5 milliliters of water saturated 1-butanol containing 0.1 milliliters of concentrated sulfuric acid, in a 3-neck flask, equipped with a magnetic stir bar and a nitrogen inlet. This mixture was stirred and allowed to reflux under an inert atmosphere, by maintaining an oil bath at a temperature of from 120 degrees Centigrade to 130 degrees Centigrade. Subsequently 1.40 grams, of 3-hydroxy-N,N-dimethylaniline was added to the reaction mixture over a period of about 8 hours (0.18 grams per hour). At the end of this period, the solution turned a dark green in color. Refluxing was continued for about 24 to 40 hours, and the reaction material was cooled to room temperature, at which time there was added 2 milliliters of triethylamine, and 30 milliliters of an ether/methanol mixture, 1:1 ratio. The resulting precipitated product was isolated from the reaction mixture by filtration through a medium sintered glass funnel followed by washing with an ether/methanol solution, 1:1 ratio, until the filtrate was light blue in color. There was obtained about 1.44 grams, 82 percent yield, of bis(2-hydroxy-4-dimethylaminophenyl)squaraine as confirmed by elemental carbon, hydrogen and nitrogen analysis, absorption spectroscopy, infrared analysis, and mass spectrum analysis. Additionally, the melting point of this material was greater than 300 degrees Centigrade.

Calculated for $C_{20}H_{20}N_2O_4$: C, 68.17; H, 5.72; N, 7.95. Found: C, 68.19; H, 5.84; N, 8.01.

EXAMPLE VIII

The above-prepared di-n-butyl squarate, 1.13 grams, 5 millimoles was dissolved in 5 milliliters of water saturated 1-butanol containing 0.1 milliliters of concentrated sulfuric acid, in a 3-neck flask, equipped with a magnetic stir bar and a nitrogen inlet. This mixture was stirred and allowed to reflux under an inert atmosphere, by maintaining an oil bath at a temperature of from 120 degrees Centigrade to 130 degrees Centigrade. Subsequently 1.68 grams, of 3-hydroxy-N,N-diethylaniline was added to the reaction mixture over a period of about 8 hours (0.21 grams per hour). At the end of this period, the solution turned a dark green in color. Refluxing was continued for about 24 to 40 hours, and the reaction material was cooled to room temperature, at which time there was added 2 milliliters of triethylamine, and 30 milliliters of an ether/methanol mixture, 1:1 ratio. The resulting precipitated product was isolated from the reaction mixture by filtration through a medium sintered glass funnel followed by washing with an ether/methanol solution, 1:1 ratio, until the filtrate was light blue in color. There was obtained about 1.84 grams, 90 percent yield, of bis(2-hydroxy-4-diethylaminophenyl)squaraine as confirmed by elemental carbon, hydrogen and nitrogen analysis, absorption spectroscopy, infrared analysis, and mass spectrum analysis. Additionally, the melting point of this material was 257 degrees Centigrade.

Calculated for: $C_{24}N_{28}N_2O_4$: C, 70.57; H, 6.91; N, 6.86. Found: C, 70.68; H, 6.84; N, 6.75.

Although the invention has been described with reference to specific preferred embodiments, it is not intended to be limited thereto, rather those skilled in the art will recognize that variations and modifications may be made therein which are within the spirit of the present invention and within the scope of the following claims.

We claim:

1. An improved process for the preparation of squaraine compositions which comprises reacting a dialkyl squarate, with an aniline, in the presence of an acid catalyst and an aliphatic alcohol, at a temperature of from about 60 degrees Centigrade to about 160 degrees Centigrade.

2. A process in accordance with claim 1 wherein the dialkyl squarate is dimethyl squarate, diethyl squarate, dipropyl squarate, dibutyl squarate, dipentyl squarate, or diheptyl squarate.

3. A process in accordance with claim 1 wherein the aniline is N,N-dimethyaniline, N,N-diethylaniline, N,N-dipropylaniline, N,N-dibutylaniline, or N,N-dipentylaniline.

4. A process in accordance with claim 1 wherein the aniline is 3-fluoro-N,N-dimethylaniline, 3-hydroxy-N,N-dimethylaniline, or 3-methyl-N,N-dimethylaniline, 3-hydroxy-N,N-diethylaniline.

5. A process in accordance with claim 1 wherein the acid catalyst is sulfuric acid, trichloroacetic acid or oxalic acid.

6. A process in accordance with claim 1 wherein the aliphatic alcohol is 1-butanol, 1-propanol, or amyl alcohol.

7. A process in accordance with claim 1 wherein there is selected from about 5 millimoles to about 50 millimoles of dialkyl squarate, from about 0.1 milliliters to about 1 milliliters of acid, from about 10 millimoles to about 100 millimoles of aniline, and from about 5 milliliters to about 50 milliliters of aliphatic alcohol.

8. A process in accordance with claim 1 wherein the reaction temperature is from about 98 degrees Centigrade to about 140 degrees Centigrade.

9. A process in accordance with claim 1 wherein the resulting squaraine product is bis(2-fluoro-4-dimethylaminophenyl)squaraine.

10. A process in accordance with claim 1 wherein the resulting squaraine product is bis(4-dimethylaminophenyl)squaraine.

11. A process in accordance with claim 1 wherein the resulting squaraine product is bis(2-hydroxy-4-dimethylaminophenyl)squaraine.

12. A process in accordance with claim 1 wherein the resulting squaraine product is bis(2-methyl-4-dimethylaminophenyl)squaraine, or bis(2-hydroxy-4-diethylaminophenyl)squaraine.

13. A process in accordance with claim 1 wherein the dialkyl squarate is di-n-butyl squarate.

14. A process for the preparation of squaraine compositions which comprises reacting at a temperature of from about 60 degrees Centigrade to about 160 degrees Centigrade in the presence of an acid catalyst and an aliphatic alcohol a dialkyl squarate of the following formula with an aniline of the following formula:

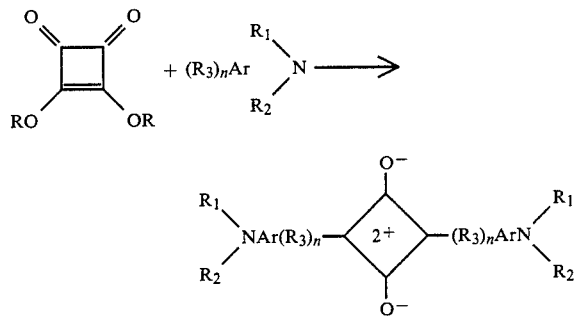

wherein R, $R_1$, $R_2$, are independently selected from alkyl groups, and $R_3$ is an alkyl group, a hydroxy group, or fluorine, Ar is an aromatic group, and n is the number zero or one.

15. A process in accordance with claim 14, wherein R, $R_1$, $R_2$, and $R_3$, are alkyl groups containing from about one carbon atom to about ten carbon atoms.

16. A process in accordance with claim 14, wherein R is butyl, Ar is phenyl, $R_1$ is methyl, $R_2$ is methyl, and n is zero.

* * * * *